No. 801,195. PATENTED OCT. 3, 1905.
D. C. LYLE.
COTTON SEED CLEANER.
APPLICATION FILED MAY 24, 1905.

2 SHEETS—SHEET 2.

Witnesses

Daniel C. Lyle, Inventor.
by C. A. Snow & Co,
Attorneys

UNITED STATES PATENT OFFICE.

DANIEL C. LYLE, OF EASTPOINT, GEORGIA, ASSIGNOR TO ATLANTA UTILITY WORKS, INC., OF EASTPOINT, GEORGIA.

COTTON-SEED CLEANER.

No. 801,195.     Specification of Letters Patent.     Patented Oct. 3, 1905.

Application filed May 24, 1905. Serial No. 262,029.

*To all whom it may concern:*

Be it known that I, DANIEL C. LYLE, a citizen of the United States, residing at Eastpoint, in the county of Fulton and State of Georgia, have invented a new and useful Cotton-Seed Cleaner, of which the following is a specification.

This invention relates to cotton-seed cleaners of that class in which the cotton-seed passes from a source of supply through a hopper to pans or shoes supported for reciprocation and thence under a suction device which operates to separate the seeds from all foreign material—such as dust, twigs, branches, rocks, bits of iron, such as nails, nuts, and the like—which may have become mixed with the seed, the latter being thus purified and prepared for the linter.

The present invention has for its object to accomplish the separation and cleansing of the cotton-seed in a rapid, efficient, and economical manner and to prevent the seeds from entering into the fan-casing of the suction device, where they would be apt to become bruised and injured by the beating action of the fan-blades.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 1:
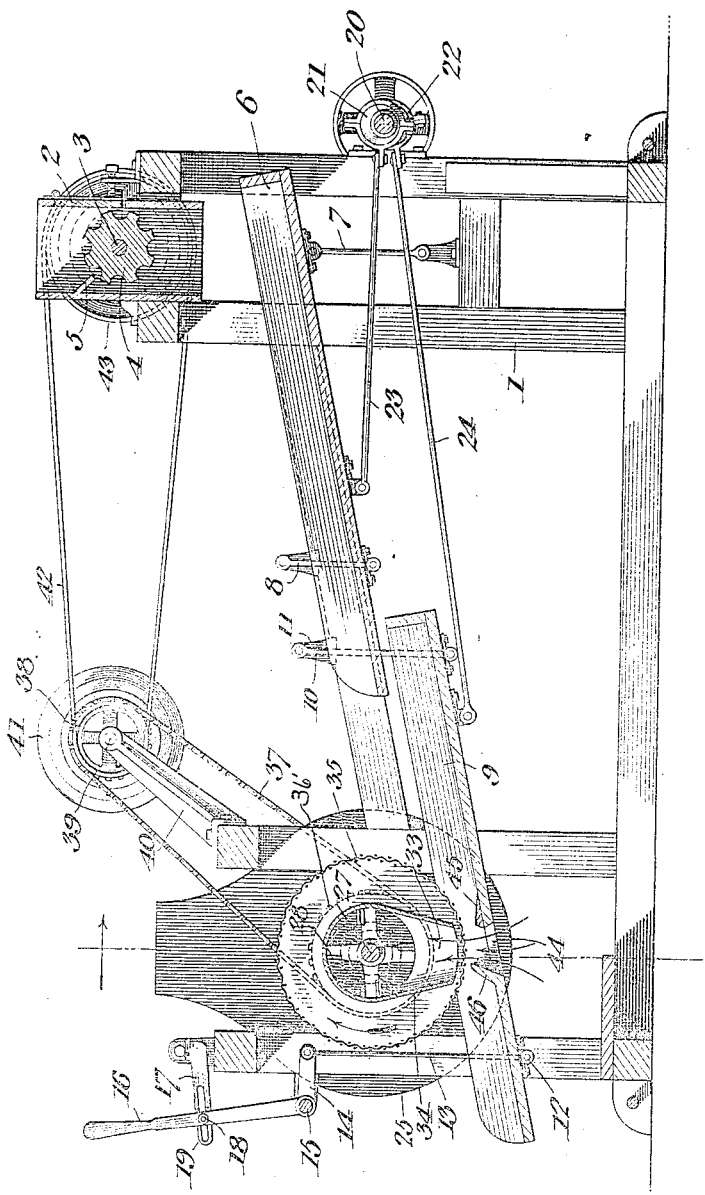
Figure 2:
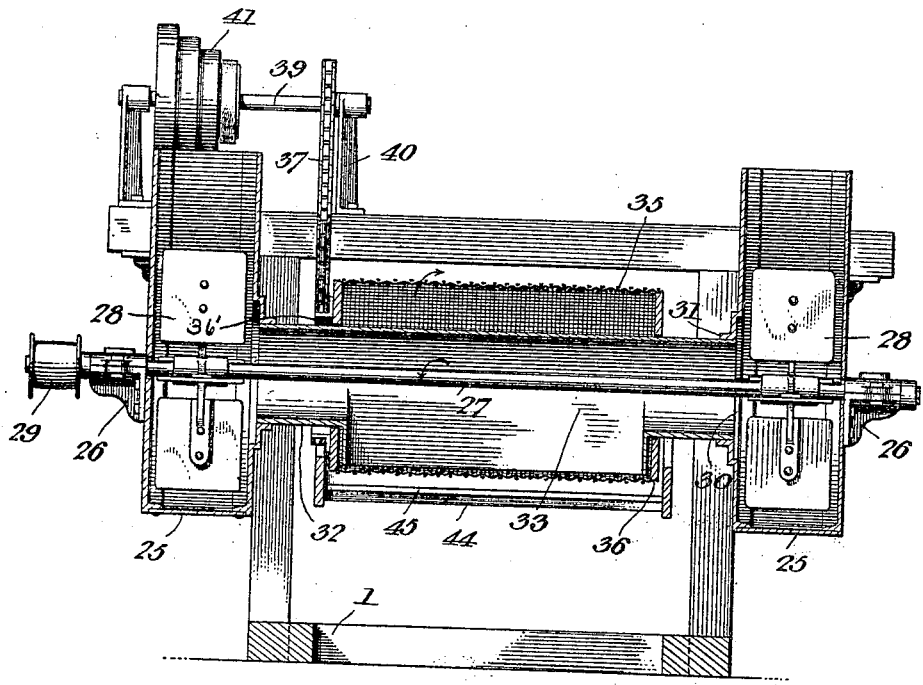
Figure 3:
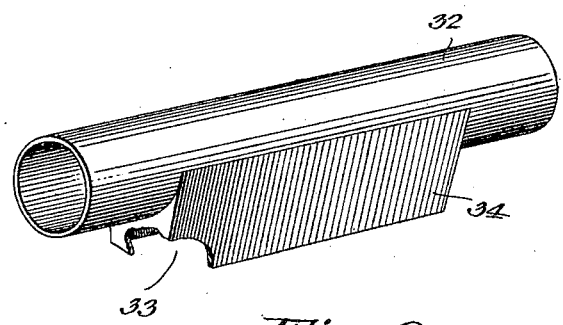

In said drawings, Figure 1 is a sectional elevation of a cotton-seed cleaner and separator constructed in accordance with the principles of the invention. Fig. 2 is a transverse sectional view taken on the plane indicated by the line 2 2 of Fig. 1. Fig. 3 is a perspective detail view of the suction-spout.

Corresponding parts of the several figures are indicated by like characters of reference.

A suitable frame 1 is provided which supports at one end thereof a chute or hopper 2, which is to be suitably connected with the source of supply of seeds and in which is mounted for rotation a shaft 3, carrying a corrugated roller 4, by the rotation of which the cotton-seed is fed over an inclined board or deflector 5 downwardly through the mouth of the hopper. Beneath the latter is supported the upper end of a shoe or shaker 6, the latter being preferably supported upon suitably-disposed links 7, which are connected with the frame by means of brackets 8 in any convenient manner, whereby said links may be permitted to vibrate freely. Beneath the discharge end of the shoe or shaker 6 is supported the receiving end of a similar shoe or shaker 9. The upper end of the latter is supported by means of links 10, connected with brackets 11, while the lower end of said shoe or shaker rests upon a transverse shaft 12, the ends of which are connected, by means of links 13, with arms 14, extending from a suitable support or rock-shaft 15, having an operating lever or handle 16, which is connected adjustably with a pivotal supporting-arm 17 by means of a bolt or fastening member 18, extending through a slot 19 in said pivoted arm. It will be observed that by adjusting the lever or handle 16 the lower or discharge end of the shaker 9 may be vertically adjusted and retained at various adjustments without interfering with its freedom of movement.

The shoes or shakers 6 and 9 are operated from a driven shaft 20, having eccentrics 21 and 22, by means of pitmen 23 and 24, pivotally connected with the shoes or shakers and provided with eccentric-straps engaging the eccentrics in the usual manner. The shoes or shakers may be driven in opposite directions and are made of such length that the receiving end of the lower shoe shall at all times be overlapped by the discharge end of the upper shoe.

Upon the sides of the frame at the end remote from the hopper 2 are supported fan-casings 25, provided upon their outer sides with brackets 26, offering bearings for a shaft 27, carrying the fans 28, which are located within the casings, the shaft 27 being driven from any suitable source of power by means of a belt or band engaging a pulley 29 upon said shaft. The inner sides of the fan-casings are provided with eyes or openings 30, surrounded by flanges 31, in which are fitted the ends of a tubular conductor 32, having in its under side a large slot or opening 33, surrounded by a depending flange 34. The cylindrical tubular conductor 32 supports for rotation a cylindrical screen 35, the heads 36 of which are fitted adjacent to the ends of the flange 34. The relative dimensions of the parts are such that the edges of the flange will extend nearly to the foraminous wall of the screen without interfering with the rotation of the latter. It is to be understood that the screen may be manufactured of any suitable material, that the heads thereof are preferably made of wood, while the screen-body may be made of wire-gauze, preferably sheet metal or any other material that may be deemed suitable for the purposes of the invention.

Under the construction illustrated in the drawings one of the screen-heads is provided with a sprocket-wheel 36', connected by a link belt 37 with a sprocket-wheel 38 upon a shaft 39, supported for rotation in brackets 40, rising from and connected with the frame of the machine. The shaft 40 carries a cone-pulley 41, which is connected by a belt 42 with a cone-pulley 43 upon the shaft 3 in the hopper 2, thus transmitting motion to the feed-shaft at a rate of speed which may be regulated by adjustment of the belt 42 upon the cone-pulleys 41 and 43.

The shaft 20, which transmits motion to the shoes or shakers, may be driven from the feed-shaft 3 in any suitable manner, or it may receive motion from any other source and in any convenient manner. (Not shown.)

The fan-casings 25 may be made to discharge in an upward direction, and the air-current, which is charged with dust and impurities, may be disposed of in any suitable manner.

The lower shoe or shaker 9 is provided directly beneath the inlet-flange 34 of the conductor 32 with a transverse slot 44, having adjacent to its upper edge a low ridge 45 and adjacent to its lower edge an inclined flange 46, which extends within a short distance of the cylindrical screen 35.

In the operation of this device the cottonseed which is to be operated upon is fed through the hopper 2 by means of the corrugated feed-roller 4 to the upper end of the shaker 6, traveling downwardly over said shaker and over the shaker 9, both of which serve to agitate and to loosen the seed and to spread it out in a comparatively thin and even layer. When the layer of seed reaches the transverse slot 34 in the shaker 9, it comes within the range of suction of the conducting-tube 32, and will thus be caused by the external air-pressure to adhere to the outer surface of the screen, which meanwhile rotates at a moderate rate of speed in the direction indicated by the arrow in Fig. 1 of the drawings. Comparatively heavy substances—such as twigs, branches, pebbles, bits of metal, and the like—will gravitate through the slot 44, and thus be disposed of, while fine dust and similar impurities will pass through the meshes of the screen and be expelled through the fan-casings. The pure cotton-seed will adhere to the surface of the screen until it passes beyond the range of suction, when it will gravitate onto the lower end of the shaker 9, below the inclined flange 46, and be permitted to escape over the lower edge of said shaker, where it may be gathered in suitable receptacles or otherwise disposed of.

It will be seen that by this improved device there is no danger or possibility of the seed entering into the fan-casings and that it is handled throughout in a manner which renders it impossible for any portion of the seed to become bruised or otherwise injured. Especially is the treatment of such a character that the lint adhering to the seeds will not only be saved from injury, but will be loosened, straightened, and put into a condition to enable it to be operated upon most efficiently when subjected to the action of a linter.

Having fully described the invention, what is claimed is—

1. A screen supported for rotation, a conductor within said screen having an opening in its lower side, a flange surrounding said opening and extending downwardly in the direction of the wall of the screen, means for setting up suction through the conductor and through the area of the screen circumscribed by the flange or mouth of the conductor, and means for feeding material beneath and in proximity to said area.

2. A screen-cylinder supported for rotation, a conductor within said screen, suction-fans connected with the ends of said conductor, a flange surrounding an opening in the conductor and depending in the direction of the screen, and a shaker supported beneath the screen and having a transverse slot in registry with the area of the screen circumscribed by said flange.

3. A cylindrical screen supported for rotation, a conductor within said screen, suction-fans connected with the ends of the conductor, a flange surrounding an opening in the conductor and depending in the direction of the wall of the screen, a shaker supported beneath the latter and having a transverse slot in registry with said flange, and an inclined flange at the lower edge of said slot forming an obstruction to the passage of material not adhering to the screen.

4. A pair of fan-casings having openings in their inner sides, a fan-carrying shaft extending through and journaled in bearings upon the outer sides of said casings, a conductor connecting the openings or eyes in the inner sides of the fan-casings and provided with a slot and a flange surrounding and depending from said slot, a screen supported for rotation upon the conductor, and means for feeding material beneath the screen.

5. A pair of fan-casings having eyes in their inner sides, a fan-carrying shaft extending through and supported in bearings upon the outer sides of said casings, flanges surrounding the eyes in the inner sides of the fan-casings, a tubular conductor supported by said flanges communicating with the fan-casings and having a slot, a flange surrounding said slot, a screen supported for rotation upon the tubular conductor, a shaker suspended beneath the screen and having a transverse slot disposed beneath the flange of the conductor, and means adjacent to the lower edge of said slot for obstructing the passage of material.

6. A cylindrical screen supported for rotation, means for setting up suction through a circumscribed area of said screen, means for feeding material adjacent to said area, and means for effecting adjustment of said feeding means toward and away from the suction area of the screen.

7. A cylindrical screen supported for rotation, means for setting up suction through a circumscribed area of said screen, a shaker for feeding material past the screen, said shaker having a transverse slot in registry with the suction area of the screen, and means for effecting adjustment of said shaker toward and away from the suction area of the screen.

8. A cylindrical screen supported for rotation, means for setting up suction through the circumscribed area of said screen, an inclined shaker for feeding material past the screen, said shaker having a transverse slot in registry with the suction area of the screen, a flange adjacent to the lower edge of said slot, and means for effecting adjustment of the shaker toward and away from the suction area of the screen.

In testimony that I claim the foregoing as my own I have hereto affixed my signature in the presence of two witnesses.

DAN C. LYLE.

Witnesses:
H. MINES,
W. A. LANDERS.